United States Patent
Yamamoto et al.

(10) Patent No.: US 12,462,148 B2
(45) Date of Patent: Nov. 4, 2025

(54) ARCHITECTURE ESTIMATION DEVICE, ARCHITECTURE ESTIMATION METHOD, AND COMPUTER READABLE MEDIUM

(71) Applicant: Mitsubishi Electric Corporation, Tokyo (JP)

(72) Inventors: Ryo Yamamoto, Tokyo (JP); Hidetomo Iwagawa, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 1140 days.

(21) Appl. No.: 17/382,749

(22) Filed: Jul. 22, 2021

(65) Prior Publication Data

US 2021/0350216 A1    Nov. 11, 2021

Related U.S. Application Data

(63) Continuation of application No. PCT/JP2019/010970, filed on Mar. 15, 2019.

(51) Int. Cl.
*G06N 3/063* (2023.01)
*G06N 3/04* (2023.01)

(52) U.S. Cl.
CPC ............ *G06N 3/063* (2013.01); *G06N 3/04* (2013.01)

(58) Field of Classification Search
CPC ............ G06N 3/063; G06N 3/06; G06N 3/04; G06N 3/02

(Continued)

(56) References Cited

U.S. PATENT DOCUMENTS

2008/0319933 A1*  12/2008  Moussa .................. G06N 3/084
                                                                706/31
2012/0159428 A1*   6/2012  Park ......................... G06F 8/36
                                                                717/110

(Continued)

FOREIGN PATENT DOCUMENTS

JP            6072383 B1     2/2017
JP         2017-111591 A     6/2017

(Continued)

OTHER PUBLICATIONS

Cheng et al., "Searching Toward Pareto-Optimal Device-Aware Neural Architectures", 2018 IEEE/ACM International Conference on Computer-Aided Design (ICCAD), Nov. 2018. (Year: 2018).*

(Continued)

*Primary Examiner* — Hwei-Min Lu
(74) *Attorney, Agent, or Firm* — Birch, Stewart, Kolasch & Birch, LLP

(57) ABSTRACT

A reception unit (110) receives NN information (151) and non-functional requirements (152) demanded for a circuit. A search unit (120) generates combinations of interlayer architectures and intra-layer architectures as architecture combinations (121). Then, the search unit (120) searches for a plurality of architecture combination candidates (122) that reduce an amount of delay as the non-functional requirements, from among the architecture combinations (121). A determination unit (130) determines whether each of the plurality of architecture combination candidates (122) satisfies the non-functional requirements (152) or not. A candidate information generation unit (140) generates candidate information (154) including architecture candidates (131) that satisfy the non-functional requirements among the plurality of architecture combination candidates (122).

6 Claims, 15 Drawing Sheets

(58) Field of Classification Search
USPC .............................................. 706/15, 16, 17
See application file for complete search history.

(56) References Cited

U.S. PATENT DOCUMENTS

| | | | |
|---|---|---|---|
| 2014/0082325 A1* | 3/2014 | Pandurangan | G06F 15/76 712/32 |
| 2016/0260008 A1* | 9/2016 | Arthur | G06N 3/04 |
| 2017/0169326 A1* | 6/2017 | Diamos | G06N 3/088 |
| 2018/0246997 A1 | 8/2018 | Yasunaka | |
| 2018/0285726 A1* | 10/2018 | Baum | G06N 3/02 |
| 2018/0336453 A1* | 11/2018 | Merity | G06N 3/044 |
| 2019/0303513 A1 | 10/2019 | Yamamoto | |
| 2019/0370659 A1* | 12/2019 | Dean | G06F 11/3495 |
| 2020/0005131 A1 | 1/2020 | Nakahara et al. | |
| 2020/0034502 A1* | 1/2020 | Ogawa | G06F 30/20 |
| 2020/0143231 A1* | 5/2020 | Fusi | G06F 18/217 |
| 2020/0257986 A1* | 8/2020 | Diamantopoulos | G06N 3/063 |

FOREIGN PATENT DOCUMENTS

| | | |
|---|---|---|
| JP | 2018-41301 A | 3/2018 |
| JP | 2018-92377 A | 6/2018 |
| WO | WO 2018/101275 A1 | 6/2018 |

OTHER PUBLICATIONS

Dai et al., "ChamNet: Towards Efficient Network Design through Platform-Aware Model Adaptation", arXiv: 1812.08934, Dec. 21, 2018. (Year: 2018).*

Jiang et al., "Accuracy vs. Efficiency: Achieving Both through FPGA—Implementation Aware Neural Architecture Search", arXiv: 1901.11211, Jan. 31, 2019. (Year: 2019).*

Huang et al., "GNAS: A Greedy Neural Architecture Search Method for Multi-Attribute Learning", arXiv: 1804.06964, Apr. 18, 2019 (Year: 2019).*

International Search Report, issued in PCT/JP2019/010970, dated May 7, 2019.

Nakahara et al., "An Object Detector based on Multiscale Sliding Window Search using a Fully Pipelined Binarized CNN on an FPGA", 2017 International Conference on Field Programmable Technology (ICFPT), Dec. 11, 2017, pp. 168-175. (especially V. Fully Pipelined Bonn Architecture) [retrieved on Apr. 15, 2019] Retrieved from IEEE Xplore, <URL: https://ieeexplore.ieee.org/abstract/document/8280135>.

* cited by examiner

Fig. 3

151 : NN INFORMATION (DNN STRUCTURE)

| LAYER | INPUT EDGE | OUTPUT EDGE |
|---|---|---|
| FIRST LAYER | 94 | 100 |
| SECOND LAYER | 100 | 100 |
| THIRD LAYER | 100 | 16 |

Fig. 4

152 : NON-FUNCTIONAL REQUIREMENT

| DEMAND | INPUT EDGE |
|---|---|
| AMOUNT OF DELAY | 25Kcycle |
| CYCLE | 25Kcycle |
| NUMBER OF DSPS (NUMBER OF MULTIPLIERS) | 60 OR LESS |

Fig. 11

| ARCHITECTURE NAME | ITEM | | OPERATION EXPRESSION [Cycle] |
|---|---|---|---|
| COMPLETE TIME DIVISION | NUMBER OF DSPS | | MAX( DSPs(Full1), DSPs(Full2), ⋯, DSPs(Full_N) ) |
| | Period (CYCLE) | | SUM( latency(Full1), latency(Full2), ⋯, latency(Full_N) ) |
| | Latency (AMOUNT OF DELAY) | | SUM( latency(Full1), latency(Full2), ⋯, latency(Full_N) ) |
| ASYNCHRONOUS PIPELINE | NUMBER OF DSPS | | SUM( DSPs(Full1), DSPs(Full2), ⋯, DSPs(Full_N) ) |
| | Period (CYCLE) | | MAX( latency(Full1), latency(Full2), ⋯, latency(Full_N) ) |
| | Latency (AMOUNT OF DELAY) | | DEPENDENT ON BLOCK ARCHITECTURE OF EACH FULLY CONNECTED LAYER |

Fig. 12

| PATTERN | EXPRESSION [cycle] |
|---|---|
| 1 | (1) A + B - C OUTPUT CYCLE OF FORMER LAYER [cycle] < INPUT CYCLE OF LATTER LAYER [cycle]<br>(2) A + B - F OUTPUT CYCLE OF FORMER LAYER [cycle] >= INPUT CYCLE OF LATTER LAYER [cycle] |
| 2 | (1) A + B - D OUTPUT CYCLE OF FORMER LAYER [cycle] < INPUT CYCLE OF LATTER LAYER [cycle]<br>(2) A + B - E OUTPUT CYCLE OF FORMER LAYER [cycle] >= INPUT CYCLE OF LATTER LAYER [cycle] |
| 3 | (1) A + B - D OUTPUT CYCLE OF FORMER LAYER [cycle] < INPUT CYCLE OF LATTER LAYER [cycle]<br>(2) A + B - F OUTPUT CYCLE OF FORMER LAYER [cycle] >= INPUT CYCLE OF LATTER LAYER [cycle] |
| 4 | (1) A + B - C OUTPUT CYCLE OF FORMER LAYER < INPUT CYCLE OF LATTER LAYER [cycle]<br>(2) A + B - E OUTPUT CYCLE OF FORMER LAYER >= INPUT CYCLE OF LATTER LAYER [cycle] |

Fig. 13

| VARIABLE NAME | | CONTENTS |
|---|---|---|
| A | | Latency OF FORMER LAYER [cycle] |
| B | | Latency OF LATTER LAYER [cycle] |
| A( ) | DII | DII IN PRODUCT-SUM OPERATION FOR FORMER LAYER [cycle] |
| | Nin | NUMBER OF INPUTS INTO FORMER LAYER |
| | Edge | UT NUMBER (PARALLEL NUMBER) ON INPUT SIDE OF FORMER LAYER |
| | Nout | NUMBER OF OUTPUTS FROM FORMER LAYER |
| | Neuron | UT NUMBER (PARALLEL NUMBER) ON OUTPUT SIDE OF FORMER LAYER |
| B( ) | DII | DII IN PRODUCT-SUM OPERATION FOR LATTER LAYER [cycle] |
| | Nin | NUMBER OF INPUTS INTO LATTER LAYER |
| | Edge | UT NUMBER (PARALLEL NUMBER) ON INPUT SIDE OF LATTER LAYER |
| | Nout | NUMBER OF OUTPUTS FROM LATTER LAYER |
| | Neuron | UT NUMBER (PARALLEL NUMBER) ON OUTPUT SIDE OF LATTER LAYER |
| C | | A(DII)*(A(INPUT DIVISION NUMBER)*(A(OUTPUT DIVISION NUMBER) − A(OPERATION-COMPLETED OUTPUT DIVISION NUMBER))) |
| D | | A(DII)*(A(OUTPUT DIVISION NUMBER) − A(OPERATION-COMPLETED OUTPUT DIVISION NUMBER)) |
| E | | B(DII)*(B(OUTPUT DIVISION NUMBER)*(B(INPUT DIVISION NUMBER) − B(OPERATION-COMPLETED INPUT DIVISION NUMBER))) |
| F | | B(DII)*(B(INPUT DIVISION NUMBER) − B(OPERATION-UNCOMPLETED INPUT DIVISION NUMBER)) |

Fig. 14

<table>
<tr><th colspan="3">22: INTRA-LAYER ARCHITECTURE</th><th colspan="4">21: INTERLAYER ARCHITECTURE   154: CANDIDATE INFORMATION</th></tr>
<tr><th>LAYER 1</th><th>LAYER 2</th><th>LAYER 3</th><th>ARCHITECTURE</th><th>NUMBER OF DSPS</th><th>CYCLE (clock)</th><th>AMOUNT OF DELAY (clock)</th></tr>
<tr><td>Unroll_IN_IN5_OUT1</td><td>Unroll_OUT_IN3_OUT15</td><td>Unroll_IN_IN7_OUT1</td><td>ASYNC</td><td>57</td><td>22378</td><td>24663</td></tr>
<tr><td>Unroll_IN_IN5_OUT1</td><td>Unroll_OUT_IN3_OUT15</td><td>Unroll_OUT_IN7_OUT1</td><td>ASYNC</td><td>57</td><td>22378</td><td>24663</td></tr>
<tr><td>Unroll_IN_IN5_OUT1</td><td>Unroll_OUT_IN1_OUT46</td><td>Unroll_IN_IN6_OUT1</td><td>ASYNC</td><td>57</td><td>22000</td><td>24676</td></tr>
<tr><td>Unroll_IN_IN5_OUT1</td><td>Unroll_OUT_IN1_OUT48</td><td>Unroll_IN_IN5_OUT1</td><td>ASYNC</td><td>58</td><td>21000</td><td>24205</td></tr>
<tr><td>Unroll_IN_IN5_OUT1</td><td>Unroll_OUT_IN1_OUT48</td><td>Unroll_OUT_IN5_OUT1</td><td>ASYNC</td><td>58</td><td>21000</td><td>24205</td></tr>
<tr><td>Unroll_IN_IN5_OUT1</td><td>Unroll_OUT_IN1_OUT46</td><td>Unroll_IN_IN7_OUT1</td><td>ASYNC</td><td>58</td><td>22000</td><td>24292</td></tr>
<tr><td>Unroll_IN_IN5_OUT1</td><td>Unroll_OUT_IN1_OUT46</td><td>Unroll_OUT_IN7_OUT1</td><td>ASYNC</td><td>58</td><td>22000</td><td>24292</td></tr>
<tr><td>Unroll_IN_IN5_OUT1</td><td>Unroll_OUT_IN3_OUT15</td><td>Unroll_IN_IN8_OUT1</td><td>ASYNC</td><td>58</td><td>22378</td><td>24375</td></tr>
<tr><td>Unroll_IN_IN5_OUT1</td><td>Unroll_OUT_IN3_OUT15</td><td>Unroll_OUT_IN1_OUT8</td><td>ASYNC</td><td>58</td><td>22378</td><td>24375</td></tr>
<tr><td>Unroll_IN_IN5_OUT1</td><td>Unroll_OUT_IN7_OUT7</td><td>Unroll_IN_IN4_OUT1</td><td>ASYNC</td><td>58</td><td>20449</td><td>24446</td></tr>
<tr><td>Unroll_IN_IN5_OUT1</td><td>Unroll_OUT_IN7_OUT7</td><td>Unroll_OUT_IN1_OUT4</td><td>ASYNC</td><td>58</td><td>20449</td><td>24446</td></tr>
<tr><td>Unroll_IN_IN5_OUT1</td><td>Unroll_OUT_IN3_OUT15</td><td>Unroll_IN_IN7_OUT1</td><td>ASYNC</td><td>58</td><td>22378</td><td>24654</td></tr>
<tr><td>Unroll_IN_IN6_OUT1</td><td>Unroll_OUT_IN3_OUT15</td><td>Unroll_OUT_IN7_OUT1</td><td>ASYNC</td><td>58</td><td>22378</td><td>24654</td></tr>
<tr><td>Unroll_IN_IN6_OUT1</td><td>Unroll_OUT_IN1_OUT46</td><td>Unroll_IN_IN6_OUT1</td><td>ASYNC</td><td>58</td><td>22000</td><td>24673</td></tr>
<tr><td>Unroll_IN_IN6_OUT1</td><td>Unroll_OUT_IN1_OUT46</td><td>Unroll_IN_IN9_OUT1</td><td>ASYNC</td><td>58</td><td>23000</td><td>24795</td></tr>
<tr><td>Unroll_IN_IN5_OUT1</td><td>Unroll_OUT_IN1_OUT44</td><td>Unroll_IN_IN8_OUT1</td><td>ASYNC</td><td>58</td><td>23000</td><td>25000</td></tr>
<tr><td>Unroll_IN_IN6_OUT1</td><td>Unroll_OUT_IN1_OUT44</td><td>Unroll_OUT_IN1_OUT8</td><td>ASYNC</td><td>58</td><td>23000</td><td>25000</td></tr>
<tr><td>IN1_OUT46</td><td>IN3_OUT15</td><td>IN15_OUT3</td><td>SEQ</td><td>45</td><td>24914</td><td>24914</td></tr>
<tr><td>IN5_OUT9</td><td>IN15_OUT3</td><td>IN15_OUT3</td><td>SEQ</td><td>45</td><td>24914</td><td>24914</td></tr>
<tr><td>IN1_OUT46</td><td>IN1_OUT46</td><td>IN23_OUT2</td><td>SEQ</td><td>46</td><td>24426</td><td>24426</td></tr>
<tr><td>IN1_OUT46</td><td>IN1_OUT46</td><td>IN46_OUT1</td><td>SEQ</td><td>46</td><td>24426</td><td>24426</td></tr>
<tr><td>IN1_OUT46</td><td>IN2_OUT23</td><td>IN23_OUT2</td><td>SEQ</td><td>46</td><td>24426</td><td>24426</td></tr>
<tr><td>IN1_OUT46</td><td>IN2_OUT23</td><td>IN46_OUT1</td><td>SEQ</td><td>46</td><td>24426</td><td>24426</td></tr>
<tr><td>...</td><td>...</td><td>...</td><td>...</td><td>...</td><td>...</td><td>...</td></tr>
</table>

ARCHITECTURE ESTIMATION DEVICE, ARCHITECTURE ESTIMATION METHOD, AND COMPUTER READABLE MEDIUM

CROSS REFERENCE TO RELATED APPLICATIONS

This application is a Continuation of PCT International Application No. PCT/JP2019/010970, filed on Mar. 15, 2019, which is hereby expressly incorporated by reference into the present application.

TECHNICAL FIELD

The present invention relates to an architecture estimation device, an architecture estimation method, and an architecture estimation program. The invention particularly relates to an architecture estimation device, an architecture estimation method, and an architecture estimation program by which optimal NN (neural network) architecture is generated.

BACKGROUND ART

In such fields as artificial intelligence, in recent years, attention has been drawn to a machine learning technique based on DNN (deep neural network) that is a multilayer neural network. Algorithm for the machine learning technique is referred to as deep learning.

In Non-Patent Literature 1, a technique by which RTL (Register Transfer Level) is generated upon input of a neural network is disclosed. In relation to Non-Patent Literature 1, high level synthesis operates internally.

CITATION LIST

Non-Patent Literature

Non-Patent Literature 1: An Object Detector based on Multiscale Sliding Window Search using a Fully Pipelined Binarized CNN on an FPGA

SUMMARY OF INVENTION

Technical Problem

In the technique of Non-Patent Literature 1, architecture that does not minimize a circuit size may be acquired depending on a requirement for processing time. That is, optimal circuit architecture may not be acquired from NN information such as number of neurons and number of layers and non-functional requirements such as processing time and circuit size.

There are trends toward increase in heaviness and circuit size in processing by artificial intelligence. Therefore, developers who develop artificial intelligence processing or circuit designers who select components of circuits have demands to evaluate in advance what circuit size is required for pertinent artificial intelligence processing. The technique of Non-Patent Literature 1, however, has a problem in that the circuit size cannot be appropriately evaluated because the optimal circuit architecture cannot be acquired.

The present invention mainly aims at assisting in more precise evaluation of circuit architecture by promptly and appropriately estimating candidates for circuit architecture that satisfies the non-functional requirements.

Solution to Problem

An architecture estimation device to estimate architecture of a circuit to execute operation represented by a neural network model including a plurality of layers, according to the present invention, includes:
a reception unit to receive neural network information representing the neural network model and non-functional requirements demanded for the circuit;
a search unit to generate combinations of interlayer architectures that are architectures between the plurality of layers and of intra-layer architectures that are architectures in each of the plurality of layers, as architecture combinations, and to search for candidates of architecture combinations that reduce an amount of delay as the non-functional requirements, as a plurality of architecture combination candidates, from among the architecture combinations;
a determination unit to determine whether each of the plurality of architecture combination candidates satisfies the non-functional requirements or not; and
a candidate information generation unit to generate candidate information in which architecture combination candidates that satisfy the non-functional requirements among the plurality of architecture combination candidates are included as architecture candidates.

Advantageous Effects of Invention

According to the architecture estimation device of the present invention, assistance in more precise evaluation of circuit architecture is enabled by promptly and appropriately estimating candidates for circuit architecture that satisfy the non-functional requirements.

BRIEF DESCRIPTION OF DRAWINGS

FIG. 3 is a configuration example of NN information according to Embodiment 1.

FIG. 4 is a configuration example of non-functional requirements according to Embodiment 1.

FIG. 11 is a diagram illustrating a scheme of evaluating processing time and the number of multipliers by architecture according to Embodiment 1.

FIG. 12 is a diagram illustrating evaluation details of an amount of delay by pattern in the asynchronous pipeline architecture according to Embodiment 1.

FIG. 13 is a diagram illustrating evaluation details of the amount of delay by pattern in the asynchronous pipeline architecture according to Embodiment 1.

FIG. 14 is a configuration example of candidate information according to Embodiment 1.

DESCRIPTION OF EMBODIMENTS

Embodiment 1

Description of Configuration

Figure 1:
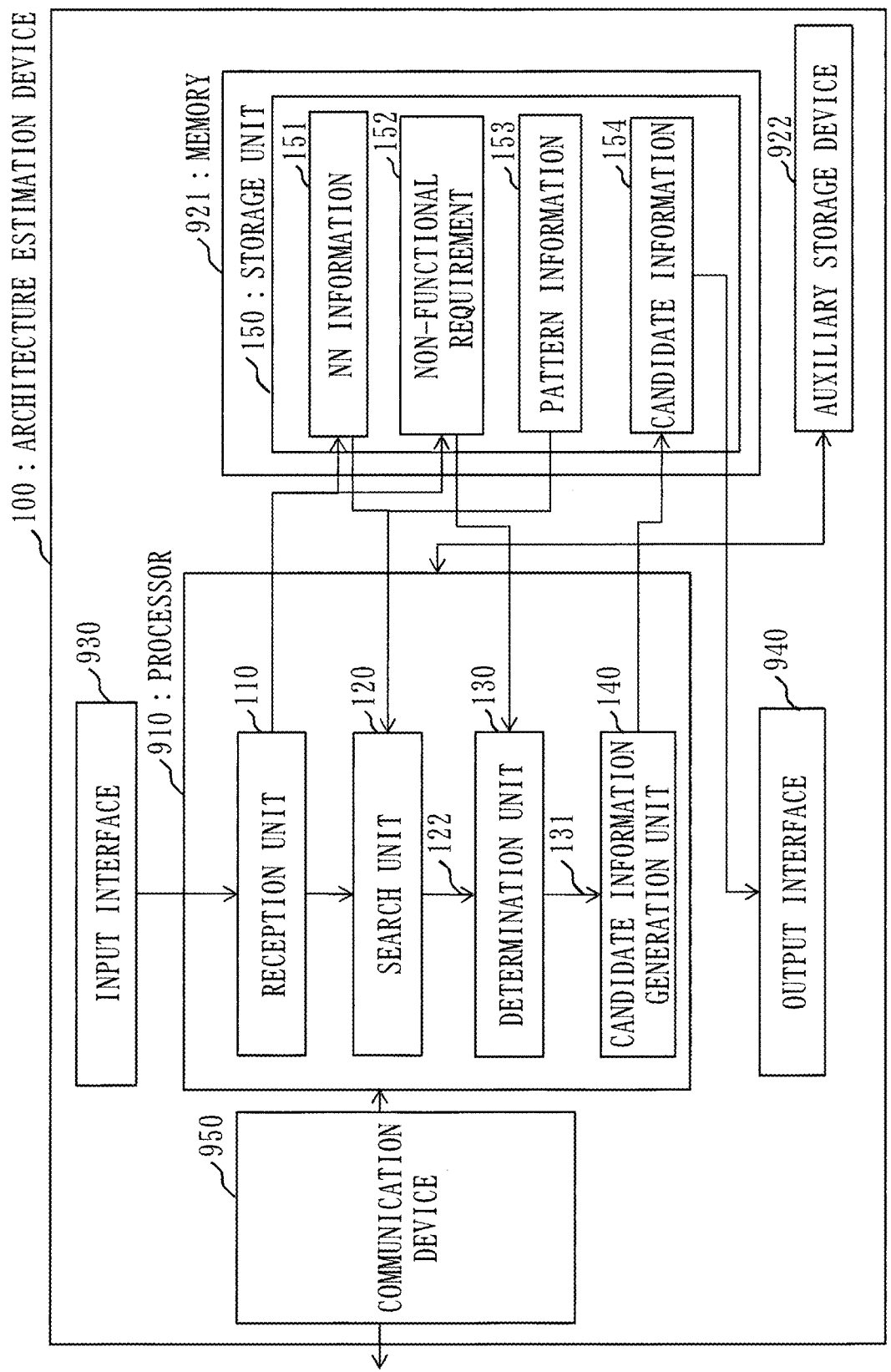
FIG. 1 is a configuration diagram illustrating an architecture estimation device according to Embodiment 1.

With use of FIG. 1, a configuration of an architecture estimation device 100 according to the present embodiment will be described.

The architecture estimation device 100 is a computer. The architecture estimation device 100 includes a processor 910 and other pieces of hardware such as a memory 921, an auxiliary storage device 922, an input interface 930, an output interface 940, and a communication device 950. The processor 910 is connected to the other pieces of hardware through signal lines so as to control the other pieces of hardware.

The architecture estimation device 100 includes a reception unit 110, a search unit 120, a determination unit 130, a candidate information generation unit 140, and a storage unit 150, as functional elements. In the storage unit 150, NN information 151 (neural network information), non-functional requirements 152, pattern information 153, and candidate information 154 are stored.

Functions of the reception unit 110, the search unit 120, the determination unit 130, and the candidate information generation unit 140 are implemented by software. The storage unit 150 is provided in the memory 921 or in the auxiliary storage device 922.

The processor 910 is a device to execute an architecture estimation program. The architecture estimation program is a program to implement the functions of the reception unit 110, the search unit 120, the determination unit 130, and the candidate information generation unit 140.

The processor 910 is an IC (Integrated Circuit) to carry out arithmetic processing. Specific examples of the processor 910 are CPU (Central Processing Unit), DSP (Digital Signal Processor), and GPU (Graphics Processing Unit).

The memory 921 is a storage device to temporarily store data. A specific example of the memory 921 is SRAM (Static Random Access Memory) or DRAM (Dynamic Random Access Memory).

The auxiliary storage device 922 is a storage device in which data is to be archived. A specific example of the auxiliary storage device 922 is HDD. The auxiliary storage device 922 may be a portable storage medium such as SD (registered trademark) memory card, CF, NAND flash, flexible disk, optical disk, compact disk, Blu-ray (registered trademark) disk, or DVD. The HDD is an abbreviation for Hard Disk Drive. The SD (registered trademark) is an abbreviation for Secure Digital. The CF is an abbreviation for CompactFlash (registered trademark). The DVD is an abbreviation for Digital Versatile Disk.

The input interface 930 is a port to be connected to an input device such as a mouse, a keyboard, or a touch panel. Specifically, the input interface 930 is a USB (Universal Serial Bus) terminal. The input interface 930 may be a port to be connected to a LAN (Local Area Network).

The output interface 940 is a port to which a cable of output equipment such as a display is to be connected. Specifically, the output interface 940 is a USB terminal or an HDMI (registered trademark) (High Definition Multimedia Interface) terminal. Specifically, the display is an LCD (Liquid Crystal Display).

The communication device 950 includes a receiver and a transmitter. The communication device 950 is connected to a communication network such as a LAN, Internet, or telephone lines in a wireless manner. Specifically, the communication device 950 is a communication chip or an NIC (Network Interface Card).

The architecture estimation program is read into the processor 910 and is executed by the processor 910. In the memory 921, not only the architecture estimation program but an OS (Operating System) is stored. The processor 910 executes the architecture estimation program while executing the OS. The architecture estimation program and the OS may be stored in the auxiliary storage device 922. The architecture estimation program and the OS that are stored in the auxiliary storage device 922 are loaded into the memory 921 and are executed by the processor 910. A portion or entirety of the architecture estimation program may be integrated into the OS.

The architecture estimation device 100 may include a plurality of processors that substitute for the processor 910. Execution of the architecture estimation program is divided among the plurality of processors. Each of the processors is a device to execute the architecture estimation program, as with the processor 910.

Data, information, signal values, and variable values that are utilized, processed, or outputted by the architecture estimation program are stored in the memory 921, the auxiliary storage device 922, or a register or a cache memory in the processor 910.

The "unit" of each of the reception unit 110, the search unit 120, the determination unit 130, and the candidate information generation unit 140 may be read as "process", "procedure", or "step". The "process" of the reception process, the search process, the determination process, and the candidate information generation process may be read as "program", "program product", or "computer-readable recording medium having a program recorded therein".

The architecture estimation program causes a computer to execute each process, each procedure, or each step that is resultant from reading of the "unit" of each of the above units as "process", "procedure", or "step". An architecture estimation method is a method that is conducted through execution of the architecture estimation program by the architecture estimation device 100.

The architecture estimation program stored in a computer-readable recording medium may be provided. Alternatively, the architecture estimation program may be provided as a program product.

<Input and Output into and from Architecture Estimation Device 100>

Figure 2:
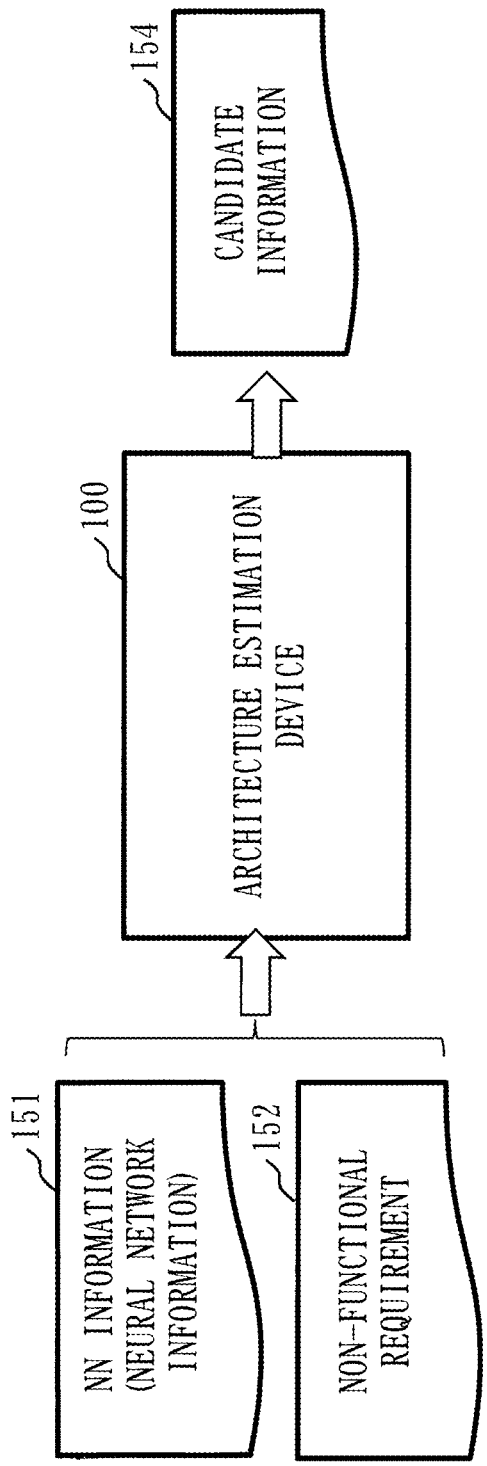
FIG. 2 is an example of input and output into and from the architecture estimation device according to Embodiment 1.

FIG. 2 is a diagram illustrating an example of input and output into and from the architecture estimation device 100 according to the embodiment.

The architecture estimation device 100 is a device to estimate architecture of a circuit to execute operation represented by a neural network model including a plurality of layers.

Into the architecture estimation device 100, the NN (neural network) information 151 and the non-functional requirements 152 are inputted through the input interface 930 or the communication device 950. Meanwhile, the architecture estimation device 100 outputs the candidate information 154 through the output interface 940 or the communication device 950.

FIG. 3 is a configuration example of the NN information 151 according to the embodiment.

FIG. 4 is a configuration example of the non-functional requirements 152 according to the embodiment.

In FIG. 3, the NN information 151 is represented by a table, for simplification of description. The NN information 151 represents a neural network model including a plurality of layers. The NN information 151 has a fully connected DNN (Deep neural network) structure. Though a description of the fully connected DNN structure will be given in relation to the embodiment, application to a feedforward CNN (Convolutional Neural Network) structure not fully connected is also feasible.

In the non-functional requirements 152, non-functional requirements demanded for a circuit are defined. In the non-functional requirements 152, specifically, an amount of delay demanded for the circuit is included. More specifically, information such as the amount of delay, a cycle, and the number of DSPs (Digital Signal Processors) of the demanded circuit is defined in the non-functional requirements 152, as illustrated in FIG. 4. The number of DSPs indicates the number of multipliers.

The candidate information 154 that is outputted from the architecture estimation device 100 will be described later.

Description of Operation

Subsequently, operation of the architecture estimation device 100 according to the embodiment will be described.

Figure 5:
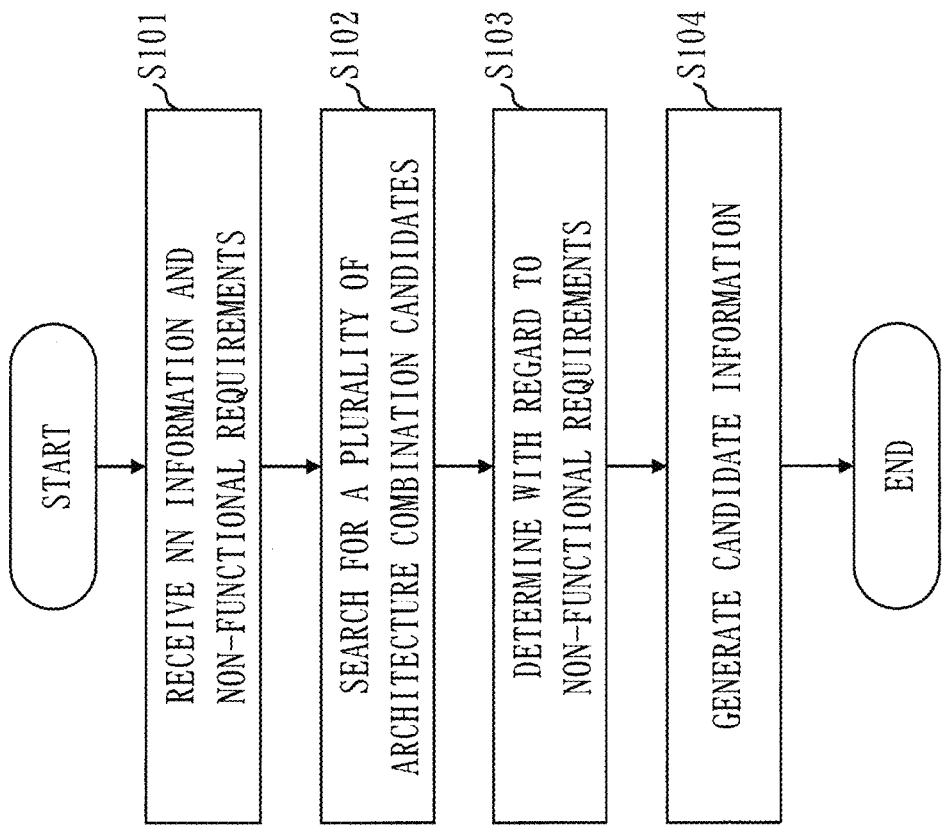
FIG. 5 is a flowchart representing operation of the architecture estimation device according to Embodiment 1.

FIG. 5 is a flowchart representing the operation of the architecture estimation device 100 according to the embodiment.

<Reception Process: Step S101>

In step S101, the reception unit 110 receives the NN information 151 representing the neural network model and the non-functional requirements 152 demanded for the circuit. The reception unit 110 stores the NN information 151 and the non-functional requirements 152 in the storage unit 150. Specifically, the reception unit 110 carries out syntax analysis (parsing) of an NN format defined by a learning framework and acquires an NN structure. In Caffe, specifically, the NN format is prototxt.

<Search Process: Step S102>

In step S102, the search unit 120 generates combinations of interlayer architectures 21 that are architectures between a plurality of layers and of intra-layer architectures 22 that are architectures in each of the plurality of layers, as architecture combinations 121. The search unit 120 searches for candidates of architecture combinations that reduce the amount of delay as the non-functional requirements 152, as a plurality of architecture combination candidates 122, from among the architecture combinations.

<Search Process: Details of Step S102>

Figure 6:
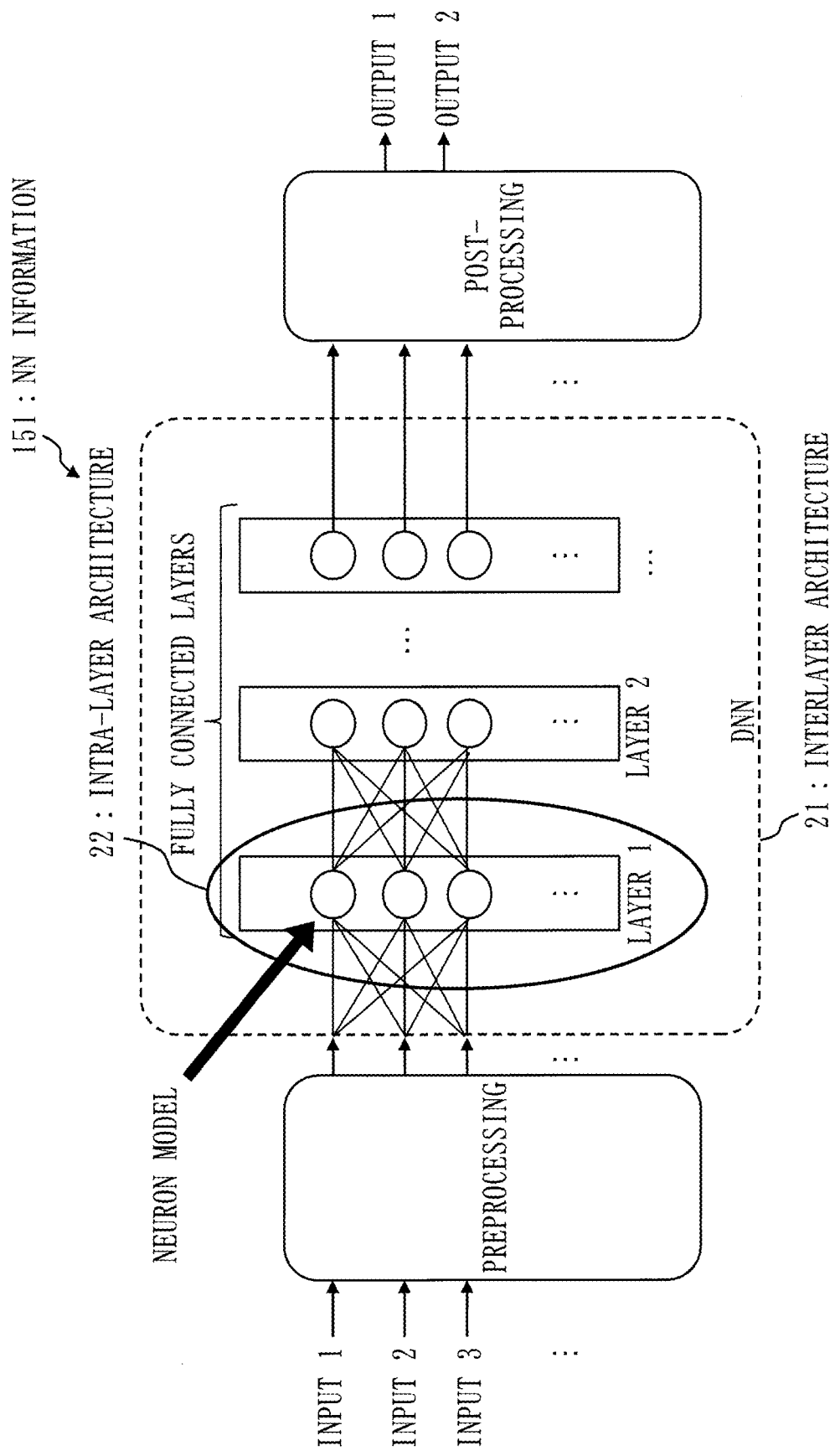
FIG. 6 is a schematic diagram representing NN information according to Embodiment 1.

FIG. 6 is a schematic diagram representing the NN information 151 according to the embodiment.

Figure 7:
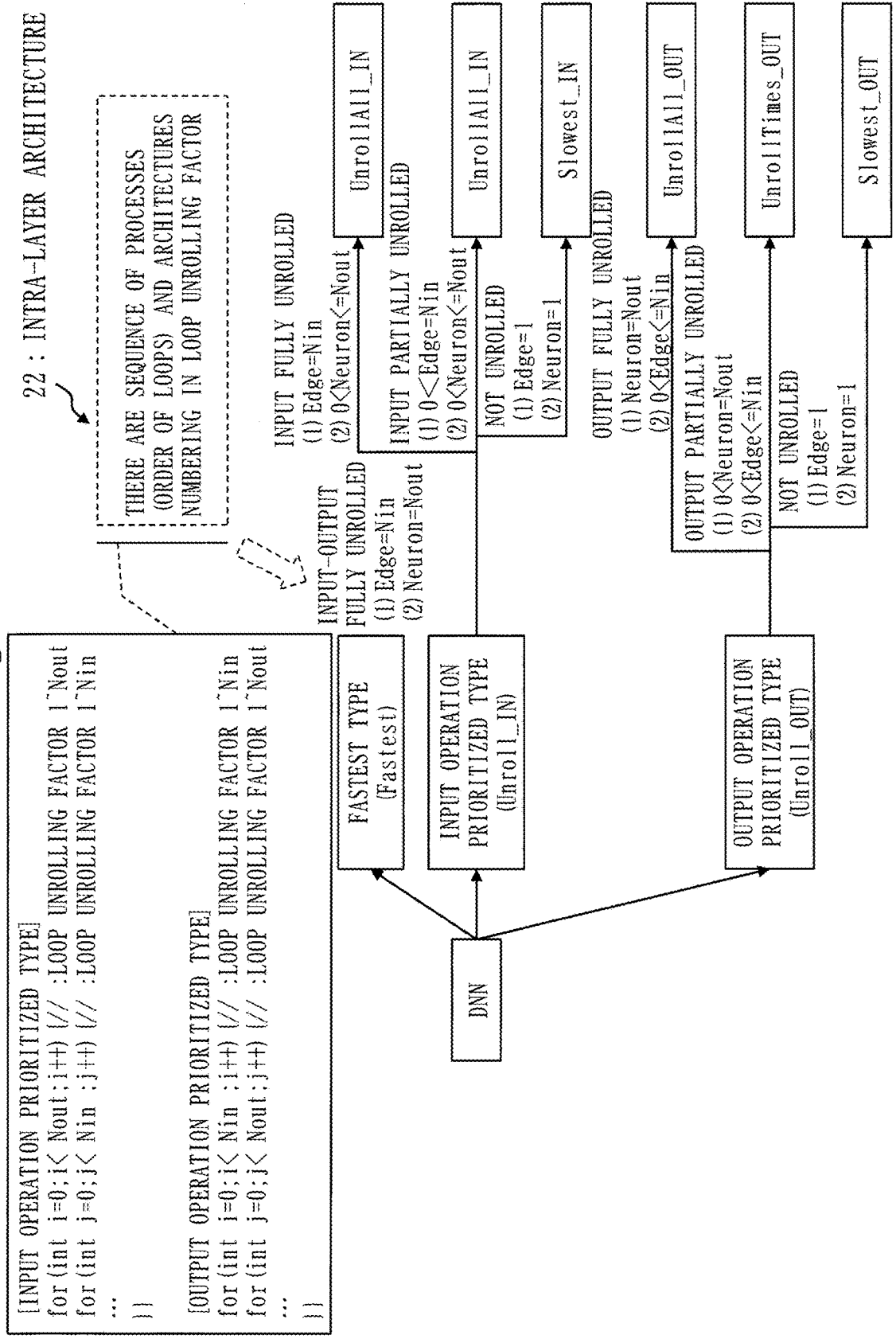
FIG. 7 is a process configuration example for intra-layer architecture of a DNN structure according to Embodiment 1.

FIG. 7 is a process configuration example for the intra-layer architecture of the DNN structure according to the embodiment.

Figure 8:
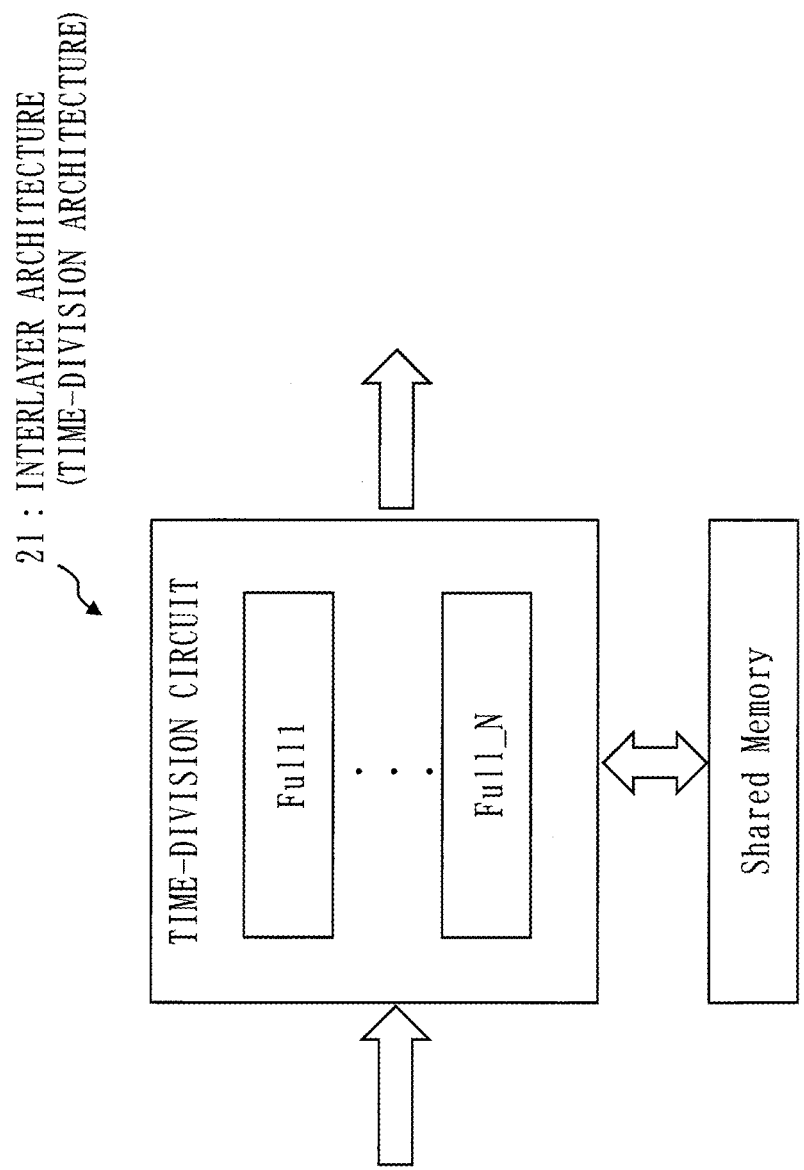
FIG. 8 is a diagram illustrating time-division architecture of the DNN structure according to Embodiment 1.

FIG. 8 is a diagram illustrating time-division architecture of the DNN structure according to the embodiment.

Figure 9:
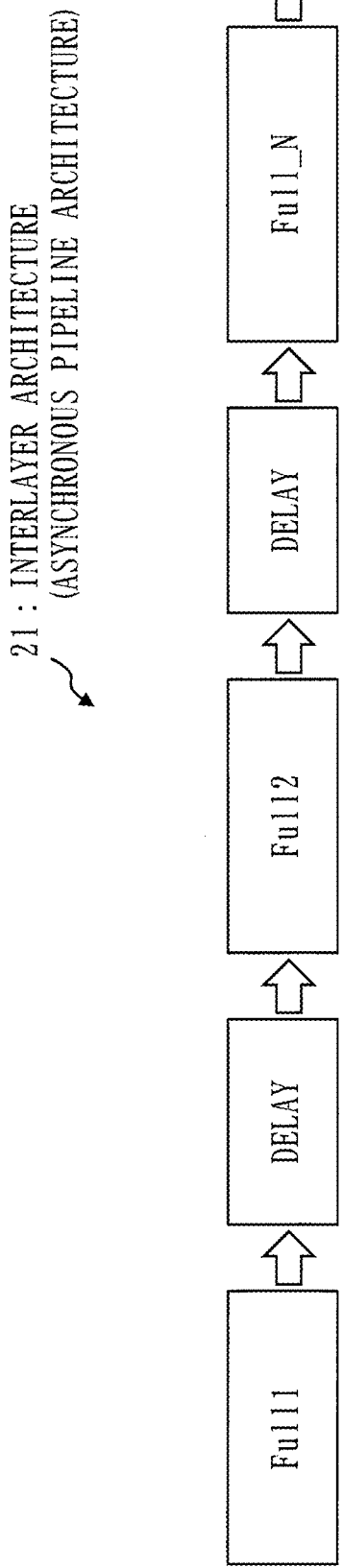
FIG. 9 is a diagram illustrating asynchronous pipeline architecture of the DNN structure according to Embodiment 1.

FIG. 9 is a diagram illustrating asynchronous pipeline architecture of the DNN structure according to the embodiment.

In the DNN structure, usually, such a process as Pooling or batch normalization may be interposed between layers. In the NN information 151 of FIG. 6, however, such a process is omitted for the simplification of description.

In the intra-layer architectures 22 of the DNN structure, as illustrated in FIG. 7, there are a sequence of processes, that is, order of loops, and architectures numbering in a loop unrolling factor.

In the interlayer architectures 21 of the DNN structure, as illustrated in FIG. 8, there is the time-division architecture that employs a calculation scheme using a time-division circuit. In the interlayer architectures 21 of the DNN structure, as illustrated in FIG. 9, there is the asynchronous pipeline architecture that employs a calculation scheme using an asynchronous pipeline circuit.

The search unit 120 searches for a plurality of architecture combinations in which input operation prioritized architecture and output operation prioritized architecture that are determined from the order of loops and the loop unrolling factor are included in the intra-layer architectures 22. Meanwhile, the search unit 120 searches for a plurality of architecture combinations in which the time-division architecture and the asynchronous pipeline architecture are included in the interlayer architectures 21.

Initially, the search unit 120 constructs all combinations of those processing schemes and generates all the architecture combinations 121.

Figure 10:
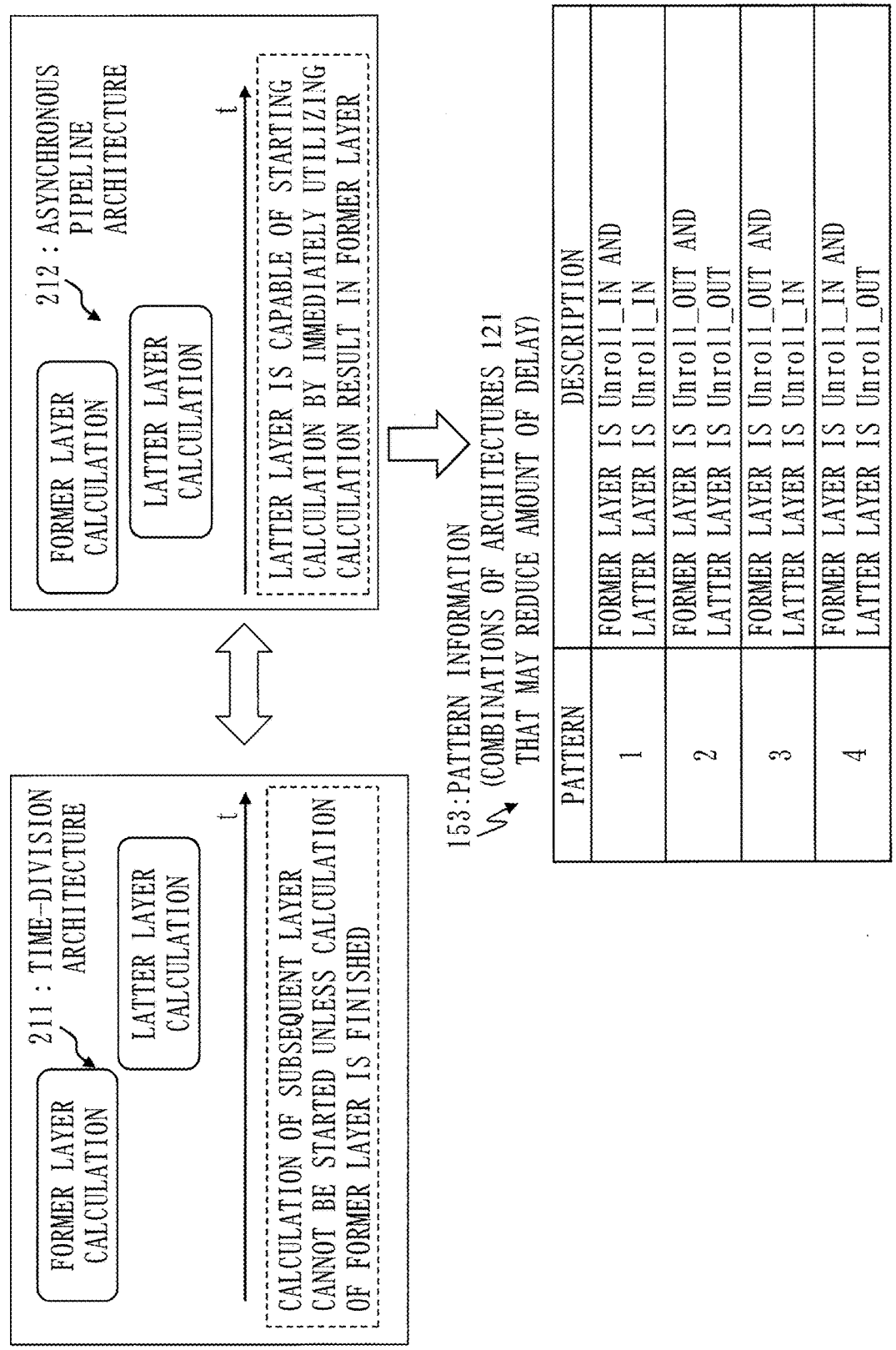
FIG. 10 is a diagram illustrating an example of pattern information according to Embodiment 1.

FIG. 10 is a diagram illustrating an example of the pattern information 153 according to the embodiment.

In time-division architecture 211, as illustrated in FIG. 10, a calculation of a subsequent layer cannot be started unless a calculation of a former layer is finished. In asynchronous pipeline architecture 212, a latter layer is capable of starting a calculation by immediately utilizing a calculation result in a former layer.

In the pattern information 153, combination patterns of the intra-layer architectures 22 that reduce the amount of delay compared with an architecture combination in which the interlayer architecture 21 is the asynchronous pipeline architecture 212 are stored. As illustrated in the pattern information 153 of FIG. 10, the combination patterns of the former layer and the latter layer are determined by combinations of the input operation prioritized architecture and the output operation prioritized architecture.

Patterns 1 to 4 of the pattern information 153 are combinations of architectures that may reduce the amount of delay (latency).

The search unit 120 searches for architecture combinations in which the interlayer architectures 21 are the asynchronous pipeline architectures and in which a combination pattern of the intra-layer architectures 22 satisfies the pattern information 153, as the plurality of architecture combination candidates 122, from among all the architecture combinations 121.

That is, the search unit 120 initially generates all the architecture combinations 121 and searches for the plurality of architecture combinations 121 from among all the architecture combinations 121, based on the pattern information 153. The search unit 120 searches for the architecture combinations in which the interlayer architectures 21 are the asynchronous pipeline architectures and in which the combination pattern of the intra-layer architectures 22 satisfies the pattern information 153, as the plurality of architecture combinations 121, from among all the architecture combinations 121.

<Determination Process: Step S103>

In step S103, the determination unit 130 determines whether each of the plurality of architecture combination candidates 122 satisfies the non-functional requirements 152 or not. The determination unit 130 outputs the architecture combination candidates by which satisfaction of the non-functional requirements 152 has been determined, among the plurality of architecture combination candidates 122, as architecture candidates 131.

FIG. 11 is a diagram illustrating a scheme of evaluating processing time and the number of multipliers (DSPs) by architecture according to the embodiment.

FIGS. 12 and 13 are diagrams illustrating evaluation details of the amount of delay by pattern in the asynchronous pipeline architecture according to the embodiment.

The determination unit 130 determines whether the plurality of architecture combination candidates 122 satisfy the non-functional requirements 152 or not, with use of such a scheme as illustrated in FIGS. 11 to 13.

Thus, the architecture estimation device 100 considers calculation order for NN that is the intra-layer architecture based on the NN information 151 and evaluates resource information such as the number of DSPs, the cycle, and the amount of delay based on the order attained in each architecture. At this time, high level synthesis is not used. In the architecture estimation device 100, the combinations of architectures that are preset in the pattern information 153 and that may reduce the latency are used for the asynchronous pipeline architecture.

<Candidate Information Generation Process: Step S104>

In step S104, the candidate information generation unit 140 generates the candidate information 154 in which the architecture combination candidates that satisfy the non-functional requirements 152 among the plurality of architecture combination candidates 122 are included as the architecture candidates 131. The candidate information generation unit 140 acquires the architecture candidates 131 from the determination unit 130 and generates the candidate information 154 by setting the acquired architecture candidates 131 in the candidate information 154. The candidate information 154 is outputted to output equipment such as a display through the output interface 940 or the communication device 950.

FIG. 14 is a diagram illustrating a configuration example of the candidate information 154 according to the embodiment.

For each of layer 1, layer 2, and layer 3, the intra-layer architecture 22 of each layer is set up. The combination of the intra-layer architectures 22 of layer 1, layer 2, and layer 3 in the asynchronous pipeline architecture is determined with use of the pattern information 153. ASYNC representing the asynchronous pipeline architecture or SEQ representing the time-division architecture is set for the interlayer architectures 21. In the candidate information 154, the architecture candidates 131 and the non-functional requirements estimated for the architecture candidates 131 are set in a line.

AI developers or circuit designers may evaluate in advance what circuit size is required for pertinent artificial intelligence processing, with use of the candidate information 154.

Description above on the architecture estimation process in the architecture estimation device 100 according to the embodiment is now ended.

Other Configurations

Modification 1

In the embodiment, the functions of the reception unit 110, the search unit 120, the determination unit 130, and the candidate information generation unit 140 are implemented by software. In a modification, the functions of the reception unit 110, the search unit 120, the determination unit 130, and the candidate information generation unit 140 may be implemented by hardware.

Figure 15:
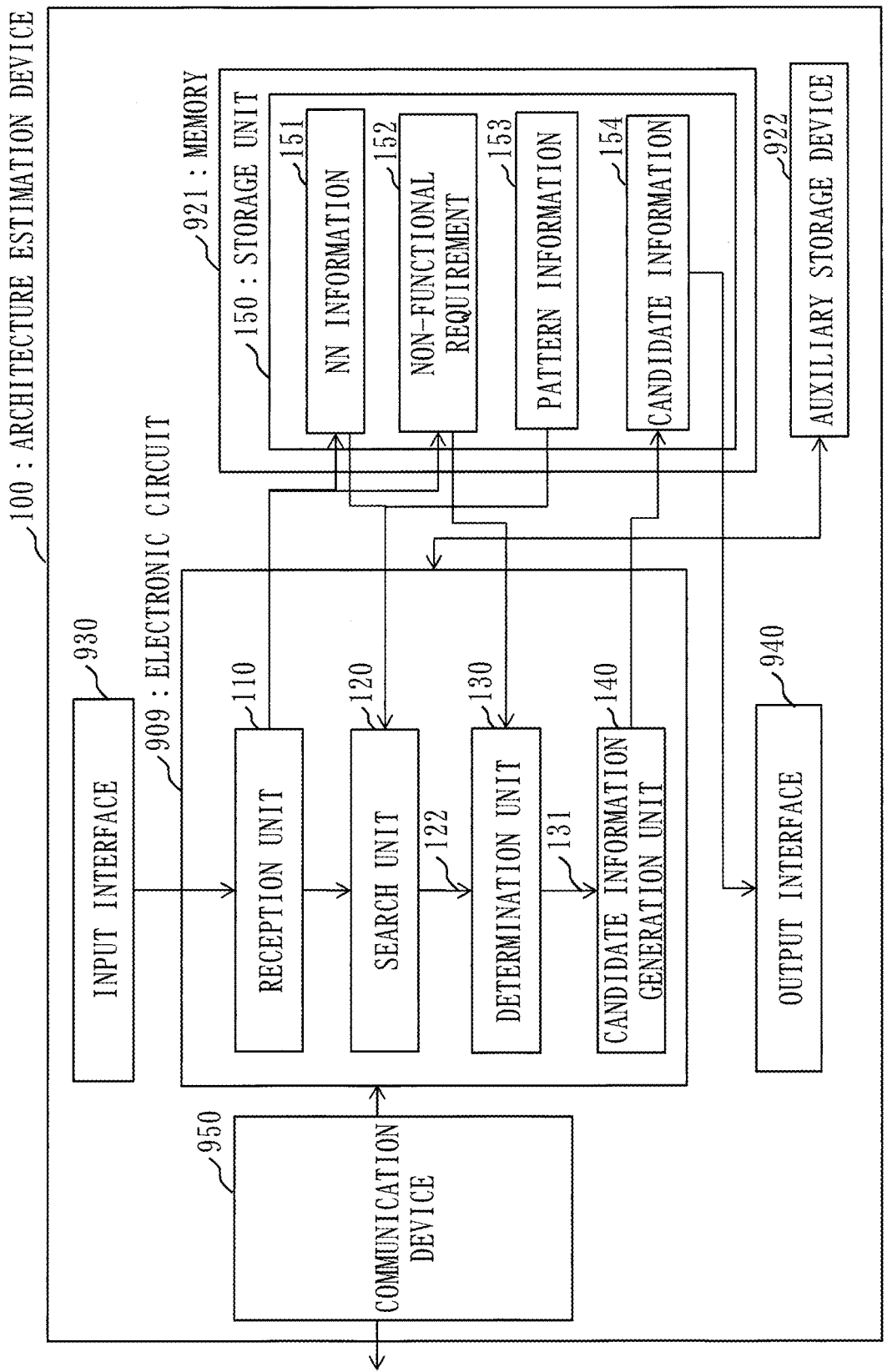
FIG. 15 is a configuration diagram illustrating the architecture estimation device according to a modification of Embodiment 1.

FIG. 15 is a diagram illustrating a configuration of the architecture estimation device 100 according to a modification of the embodiment.

The architecture estimation device 100 includes an electronic circuit 909, the memory 921, the auxiliary storage device 922, the input interface 930, and the output interface 940.

The electronic circuit 909 is a dedicated electronic circuit to implement the functions of the reception unit 110, the search unit 120, the determination unit 130, and the candidate information generation unit 140.

Specifically, the electronic circuit 909 is a single circuit, a composite circuit, a programmed processor, a parallelly programmed processor, a logic IC, a GA, an ASIC, or an FPGA. The GA is an abbreviation for Gate Array. The ASIC is an abbreviation for Application Specific Integrated Circuit. The FPGA is an abbreviation for Field-Programmable Gate Array.

The functions of the reception unit 110, the search unit 120, the determination unit 130, and the candidate information generation unit 140 may be implemented by one electronic circuit or may be implemented by being distributed among a plurality of electronic circuits.

In another modification, a portion of the functions of the reception unit 110, the search unit 120, the determination unit 130, and the candidate information generation unit 140 may be implemented by an electronic circuit and the remainder of the functions may be implemented by software.

In still another modification, a portion or all of the functions of the reception unit 110, the search unit 120, the determination unit 130, and the candidate information generation unit 140 may be implemented by firmware.

Each of the processors and the electronic circuits may be referred to as processing circuitry. That is, the functions of the reception unit 110, the search unit 120, the determination unit 130, and the candidate information generation unit 140 in the architecture estimation device 100 are implemented by the processing circuitry.

Description of Effects of Present Embodiment

Into the architecture estimation device 100 according to the embodiment, a model of a neural network and the non-functional requirements including throughput and the number of DSPs available on FPGA are inputted. Then, the architecture estimation device 100 searches for a DNN circuit configuration on the FPGA that satisfies the non-functional requirements. A DNN calculation order optimization unit changes calculation order for each layer of the DNN. Further, the architecture estimation device 100 searches for circuit architecture on the FPGA with the number of DSPs available set as an upper limit and outputs architecture on the FPGA that satisfies the throughput and the latency. The architecture estimation device 100 enables design of an optimal circuit in a short time without dependence on AI developers or designers.

Additionally, the architecture estimation device 100 according to the embodiment is capable of acquiring optimal AI inference circuit architecture in a short time even without knowledge on circuit implementation. Further, it can be understood, in a short time without designing, to what extent speed-up is feasible with conversion to LSI and what circuit size is required therefor. Moreover, output of DNN circuit information (latency and size of each layer) enables understanding of a bottleneck in the circuit and feedback to DNN design.

In the architecture estimation device 100 according to the embodiment, appropriate circuit architecture with high performance and small size is dependent on a demanded network with regard to AI inference. Therefore, a circuit appropriate to the network can be produced. In addition, the architecture estimation device 100 according to the embodiment enables specialization of the interlayer architecture or search technique for AI in DNN and a change in the calculation order in the layers, which results in the optimal calculation order among the plurality of layers.

Further, the architecture estimation device 100 according to the embodiment is capable of evaluating non-functions of all the possible architectures under constraint of the set DSP upper limit in consideration of the change in the calculation order in each layer of DNN. Then, architecture that satisfies the non-functional requirements and that involves minimized resources can be selected from thereamong. Thus, the architecture that automatically satisfies the processing time and that results in minimum circuit size can be acquired.

In relation to above Embodiment 1, the units of the architecture estimation device have been described as independent functional blocks. The configuration of the architecture estimation device, however, may be other than such a configuration as in the embodiment described above. The functional blocks of the architecture estimation device may have any configuration as long as the functions described in relation to the above embodiment can be implemented. The architecture estimation device may be a system including a plurality of devices, instead of the one device.

A plurality of portions of Embodiment 1 may be implemented in combination. Alternatively, a portion of this embodiment may be implemented. Otherwise, this embodiment may be implemented generally or partially in combination in any manner.

In Embodiment 1, namely, free combination of embodiments, modification in any components of embodiments, or omission of any components of embodiments may be fulfilled.

The above embodiment is a preferred exemplification in essence, not intended to confine the present invention or scopes of applications or uses thereof, and may be modified in various manners as appropriate.

REFERENCE SIGNS LIST

21: interlayer architecture; 22: intra-layer architecture; 100: architecture estimation device; 110: reception unit; 120: search unit; 121: architecture combination; 122: a plurality of architecture combination candidates; 130: determination unit; 131: architecture candidate; 140: candidate information generation unit; 150: storage unit; 151: NN information; 152: non-functional requirement; 153: pattern information; 154: candidate information; 211: time-division architecture; 212: asynchronous pipeline architecture; 909: electronic circuit; 910: processor; 921: memory; 922: auxiliary storage device; 930: input interface; 940: output interface; 950: communication device

The invention claimed is:
1. An architecture estimation device to estimate architecture of a circuit to execute operation represented by a neural network model including a plurality of layers, the architecture estimation device comprising:
processing circuitry
to receive neural network information representing the neural network model and non-functional requirements demanded for the circuit, the non-functional requirements including an amount of delay and number of processors,
to generate combinations of interlayer architectures that are architectures between the plurality of layers and combinations of intra-layer architectures that are architectures in each of the plurality of layers, as architecture combinations for the neural network model, and to search for a plurality of architecture combination candidates among the combinations of interlayer architecture that reduce the amount of delay based on the non-functional requirements,
to determine whether each of the plurality of architecture combination candidates satisfies the non-functional requirements or not,
to generate candidate information in which architecture combination candidates that satisfy the non-functional requirements among the plurality of architecture combination candidates are included as architecture candidates, and
to produce a neural network circuit based on one of the architecture candidates.

2. The architecture estimation device according to claim 1, wherein the processing circuitry
searches for the plurality of architecture combination candidates in which time-division architecture and asynchronous pipeline architecture are included in the interlayer architectures.

3. The architecture estimation device according to claim 2, comprising:
a storage to store a pattern of the intra-layer architectures that reduces the amount of delay compared with an architecture combination in which the interlayer architectures are the asynchronous pipeline architectures, as pattern information, wherein
the architecture estimation device searches for architecture combinations in which the interlayer architectures are the asynchronous pipeline architectures and in which a combination pattern of the intra-layer architectures satisfies the pattern information, as the plurality of architecture combination candidates.

4. The architecture estimation device according to claim 3, wherein
the processing circuitry searches for the plurality of architecture combination candidates in which input operation prioritized architecture and output operation prioritized architecture that are determined from order of loops are included in the intra-layer architectures, and
the pattern information has a combination pattern of a former layer and a latter layer determined as a combination of the input operation prioritized architecture and the output operation prioritized architecture.

5. An architecture estimation method by an architecture estimation device to estimate architecture of a circuit to execute operation represented by a neural network model including a plurality of layers, the architecture estimation method comprising:
receiving neural network information representing the neural network model and non-functional requirements demanded for the circuit, the non-functional requirements including an amount of delay and number of processors;

generating combinations of interlayer architectures that are architectures between the plurality of layers and combinations of intra-layer architectures that are architectures in each of the plurality of layers, as architecture combinations for the neural network model, and searching for a plurality of architecture combination candidates that reduce the amount of delay based on the non-functional requirements;

determining whether each of the plurality of architecture combination candidates satisfies the non-functional requirements or not;

generating candidate information in which architecture combination candidates that satisfy the non-functional requirements among the plurality of architecture combination candidates are included as architecture candidates; and producing a neural network circuit based on one of the architecture candidates.

6. A non-transitory computer readable medium recorded with an architecture estimation program for an architecture estimation device to estimate architecture of a circuit to execute operation represented by a neural network model including a plurality of layers, the architecture estimation program that causes the architecture estimation device that is a computer to execute:

a reception process of receiving neural network information representing the neural network model and non-functional requirements demanded for the circuit, the non-functional requirements including an amount of delay and number of processors;

a search process of generating combinations of interlayer architectures that are architectures between the plurality of layers and combinations of intra-layer architectures that are architectures in each of the plurality of layers, as architecture combinations for the neural network model, and searching for a plurality of architecture combination candidates that reduce the amount of delay based on the non-functional requirements;

a determination process of determining whether each of the plurality of architecture combination candidates satisfies the non-functional requirements or not;

a candidate information generation process of generating candidate information in which architecture combination candidates that satisfy the non-functional requirements among the plurality of architecture combination candidates are included as architecture candidates; and a production process of producing a neural network circuit based on one of the architecture candidates.

* * * * *